United States Patent Office 3,344,194
Patented Sept. 26, 1967

3,344,194
PROCESS FOR PREPARATION OF
PEROXIDE PRODUCTS
Scott I. Morrow, Morris Plains, N.J., assignor to Thiokol Chemical Corporation, Bristol, Pa., a corporation of Delaware
No Drawing. Filed Nov. 2, 1964, Ser. No. 408,376
13 Claims. (Cl. 260—610)

This invention concerns a novel process for making fluorinated oxidizer.

More particularly, this invention relates to the preparation of perfluorodimethyl peroxide, $CF_3OOCF_3$. This composition is a mild oxidizing agent, which is useful in the controlled oxidation of relatively unstable substrates. In addition, the compound is a useful intermediate in the synthesis of other fluoro-chemicals.

Perfluorodimethyl peroxide has a potentially large commercial market both as a mild oxidizing agent and as an intermediate. At the present time, the cost of the product is relatively high because no simple preparative process is available. For example, the prior art processes either require special equipment, extreme reaction conditions and/or the use of catalysts. For example, some prior art processes require the use of electrolytic equipment and electrolytic techniques, while others are operable only at high temperatures and pressures.

A process for preparing this product in good yield, using mild reaction conditions and readily available starting materials would represent an important advance in the art.

Thus, it is an object of this invention to prepare perfluorodimethyl peroxide by a novel process using mild reaction conditions and readily available starting materials.

It is a further object of this invention to prepare perfluorodimethyl peroxide by an alternative process in good yield in a high state of purity.

Other objects will become apparent to those skilled in the art after a perusal of this application.

In practice, an oxalate of a metal selected from the groups consisting of Group I and Group II of the Periodic Table is contacted with fluorine gas diluted with a gas diluent selected from the group consisting of inert gases, oxygen, and mixtures of inert gases and oxygen, until the evolution of gaseous products has substantially ceased. These gases, in addition to $CF_3OOCF_3$ product include lesser amounts of $CO_2$ and $CF_3OF$ as well as trace amounts of other peroxide materials. The evolved gases including product are condensed and separated using standard isolation and purification procedures such as gas chromatography and the like.

The preparative reaction of this invention is exothermic and can be conducted within a wide range of reaction temperatures. The operable temperature ranges from below 0° C. to 300° C. and higher. Temperature control at around 10–15° C. or lower is maintained by external cooling while at temperatures substantially above room temperatures external heating means are used. When temperatures above 200° C. are used it is desirable that the contact time of the reactants at these temperatures be of short duration. This can be done in a number of ways including passing the fluorine reactant diluted or undiluted into a heated reaction zone containing finely divided oxalate reactant, suspended in the zone or in the form of a fixed or fluid bed. At the desired time interval the gaseous reactants and products can be swept from the reaction zone, condensed to separate products from reactants and if desired the unreacted residue can be recycled for further reaction or discarded. As indicated, temperatures from 150° C. to 300° C. requires more control of the reaction conditions such as reaction time, are more likely to cause rearrangement or side reactions to take place and for these reasons these upper temperatures are not favored for small scale preparations. On the other hand, at temperatures substantially below 50° C. reaction times are unduly prolonged with no apparent advantage. For these reasons the preferred procedure is to use external heating to maintain the temperature range from about 50° C. to about 150° C.

The ratio of the two reactants is not critical in that an excess of either reactant is not deleterious. However, the preferred practice is to use a large excess of fluorine over the amount required by stoichiometry. Ordinarily this excess is from 2–10 times the required amount, although larger excesses are not harmful.

The pressure used throughout the inventive process ordinarily approximately atmospheric pressures. However, higher than atmospheric pressures can be used if desired. Since the use of pressures substantially higher than atmospheric pressure increases both operating costs and operating hazards, their use is discouraged.

As indicated above, the addition of an inert gas to dilute the fluorine reactant is recommended. The diluent serves to moderate the vigorousness of the reaction. Helium, argon, neon, xenon, nitrogen, and the like are equally useful as inert gas diluents. The ratio of inert gas to fluorine is not critical as long as at least about 3.5:1 molar ratio of inert gas to fluorine is present. This is the amount of inert gas that has been experimentally determined to be adequate to moderate the reaction rate. However, recent experimental work indicates that the use of oxygen or an inert gas-oxygen mixture as diluent may catalyse the reaction and produces small quantities of yet to be characterized peroxygen product.

The reaction time being dependent upon reactant, flow rate, temperature, pressure, and geometry of the system cannot be stated with precision. However, under the preferred temperature conditions and an average flow rate of fluorine, the reaction is ordinarily complete within 1–8 hours with 2–4 hours being a more typical figure.

The oxalates of a metal of Group I and Group II of the Periodic Table are commercially available materials. Because of cost and availability sodium oxalate is preferred as the oxalate reactant. However, potassium, lithium, calcium and magnesium oxalate can be used with satisfactory results.

To more fully indicate the workings of this invention the following illustrative embodiments are submitted.

In the preferred embodiment of this invention 1.91 grams of sodium oxalate in a reaction is contacted with an excess of a fluorine-helium, reaction gas mixture. The fluorine is fed into the reaction at a rate of 1.2 liters/hour and the helium at a rate of 4.2 liters/hour. The reaction is heated to 84° C. during the addition of fluorine-helium and the exothermic nature of the reaction raises the reaction temperature to 92° during the reaction. A total of 23.4 millimoles of reaction gases including product is obtained. Analysis of these gases indicates a major proportion of $CF_3OOCF_3$ product and lesser amounts of $CO_2$ and $CF_3OF$. The material balance indicates a 102% conversion of sodium oxalate to sodium fluoride.

In another embodiment 2.24 grams of potassium oxalate in a platinum boat is reacted with 6 liters/hour of a helium-fluorine mixture (4:1 volume ratio) at about 95° C. for 4 hours. The temperature rose to 100° C. during the reaction. Approximately the same mixture of reaction gases is obtained and potassium fluoride is the by-product.

In related embodiments, comparable results are obtained using in one run lithium oxalate and a second run calcium oxalate as the oxalate reactant. A fluorine-neon (1:3.5 molar ratio) reaction mixture is used as diluent. Flow rates, reaction temperatures and times are substantially as before.

In yet a further embodiment of this invention, 1.91 grams of sodium oxalate in a reactor is contacted with an excess of an equivolume fluorine-helium-oxygen reaction gas mixture. The fluorine, oxygen and helium are fed into the reaction at a rate of 3.0 liters/hour. The reaction is heated to about 70° C. during the addition of the reaction and the exothermic nature of the reaction substantially raises the reaction temperature during the reaction. Analysis of the reaction gases indicates a major proportion of $CF_3OOCF_3$ product and lesser amounts of $CO_2$ and $CF_3OF$ and a mixture of complex unidentified peroxides are formed. The sodium oxalate is quantatively converted to sodium fluoride.

In still a further embodiment an excess of 4:1 air-fluorine mixture is passed at the rate of 4 liters/hour over a reaction zone consisting of finely powdered sodium oxalate bed heated to 250° C. contained in a tubular reactor. The sodium oxalate is kept suspended by blowing a stream of air from the bottom of the reaction zone. The exhaust gases including reactant is condensed to remove products and recycled to the reaction zone for further reaction. After an hour the product condensate contains a large proportion of $CF_3OOCF_3$ product as well as lesser quantities of $CO_2$, and unidentified peroxide by-products.

As the embodiments above indicate, numerous changes and modifications can be made in the reactants and reaction conditions without departing from the inventive process. The scope of the invention is best shown by the claims which follow.

I claim:

1. A process for preparing perfluorodimethyl peroxide product comprising contacting an oxalate of a metal selected from Group I and II of the Periodic Table, with fluorine until the reaction gases including product are evolved and separating the product contained therein.

2. A process for preparing perfluorodimethyl peroxide product comprising contacting an oxalate of a metal from Group I and II of the Periodic Table, with fluorine in the presence of an inert gas diluent, until reaction gases including product are evolved and separating the product contained therein.

3. A process for preparing perfluorodimethyl peroxide product comprising contacting metal oxalates selected from the group consisting of Group I and II of the Periodic Table, with fluorine in the presence of an inert gas diluent, at temperatures ranging from about 0 to 250 C., until reaction gases including product are evolved are evolved and separating the product contained therein.

4. The process of claim 3 wherein the metal oxalate is sodium oxalate and the inert gas diluent is helium.

5. The process of claim 3 wherein the metal oxalate is potassium oxalate and the inert gas diluent is helium.

6. The process of claim 3 wherein the metal oxalate is lithium oxalate and the inert gas diluent is helium.

7. A process for preparing peroxide products including peroxide, comprising contacting an oxalate of a metal selected from group consisting of Group I and Group II of the Periodic Table with fluorine in the presence of oxygen at temperatures from about 0 to 300° C. until reaction gases including perfluorodimethyl peroxide products are evolved and separating the products contained.

8. A process for preparing peroxide products including perfluorodimethyl peroxide, comprising contacting sodium oxalate with a mixture of fluorine and oxygen at temperatures from about 0 to 300° C. until reaction gases including peroxide products and perfluorodimethyl peroxide are evolved and separating the products contained therein.

9. A process for preparing peroxide products including perfluorodimethyl peroxide, comprising contacting potassium oxalate with a mixture of fluorine and oxygen at temperatures from about 0 to 300° C. until reaction gases including peroxide products and perfluorodimethyl peroxide are evolved and separating the products contained therein.

10. A process for preparing peroxide products including perfluorodimethyl peroxide, comprising contacting lithium oxalate with a mixture of fluorine and oxygen at temperatures from about 0 to 300° C. until reaction gases including peroxide products and perfluorodimethyl peroxide are evolved and separating the products contained therein.

11. A process for preparing peroxide products including perfluorodimethyl peroxide, comprising contacting sodium oxalate with a mixture of fluorine, an inert gas and oxygen at temperatures from about 0 to 300° C. until reaction gases including peroxide products and perfluorodimethyl peroxide are evolved and separating the products contained therein.

12. A process for preparing peroxide products including perfluorodimethyl peroxide, comprising contacting potassium oxalate with a mixture of fluorine, an inert gas and oxygen at temperatures from about 0 to 300° C. until reaction gases including peroxide products and perfluorodimethyl peroxide are evolved and separating the products contained therein.

13. A process for preparing peroxide products including perfluorodimethyl peroxide, comprising contacting lithium oxalate with a mixture of fluorine, an inert gas and oxygen at temperatures from about 0 to 300° C. until reaction gases including peroxide products and perfluorodimethyl peroxide are evolved and separating the products contained therein.

No references cited.

LEON ZITVER, *Primary Examiner.*

W. B. LONE, *Assistant Examiner.*